United States Patent [19]
Sehr

[11] Patent Number: 5,566,327
[45] Date of Patent: Oct. 15, 1996

[54] COMPUTERIZED THEME PARK INFORMATION MANAGEMENT SYSTEM UTILIZING PARTITIONED SMART CARDS AND BIOMETRIC VERIFICATION

[76] Inventor: Richard P. Sehr, 2276 Creek Bed Ct., Santa Clara, Calif. 95054

[21] Appl. No.: 272,086

[22] Filed: Jul. 8, 1994

[51] Int. Cl.$^6$ .................................................. G06F 17/30
[52] U.S. Cl. ................ 395/600; 364/401 R; 364/974; 364/918.5; 364/DIG. 2; 364/918.2; 364/225.2; 364/282.4; 364/DIG. 1; 235/380; 235/379
[58] Field of Search .................... 395/600; 364/401; 235/379, 380

[56] References Cited

U.S. PATENT DOCUMENTS

| | | | |
|---|---|---|---|
| 4,752,676 | 6/1988 | Leonard et al. | 235/379 |
| 5,067,162 | 11/1991 | Driscoll et al. | 382/186 |
| 5,155,342 | 10/1992 | Urano | 235/380 |
| 5,264,689 | 11/1993 | Maes et al. | 235/492 |
| 5,302,811 | 4/1994 | Fukatsu | 235/381 |

OTHER PUBLICATIONS

Anonymous, "New Services: Debit Card Rollercoaster Stops at Texas Amusement Park AstroWorld: Uses Financial Interchange/First City Bancorp POS Svc for Theme Park", EFT Report, Aug. 8, 1988, p. 8.

Joan H. Murphy, "Opryland: Security in Harmony", *Security Management*, vol. 33, No. 8, Aug., 1989, pp. 89–91.

Anonymous, "How Debit is Accepted in Some Amusing Ways", *POS News*, Jan. 1, 1992, pp. N/A.

Carl Shakford, "A Jungle Out There. (Anheuser Bush Theme Parks)(case Study)", *LAN Magazine*, vol. 10, No. 7, pp. 127–131.

*Primary Examiner*—Thomas G. Black
*Assistant Examiner*—Paul R. Lintz

[57] ABSTRACT

A computerized theme park information system that encompasses the operational premises of that theme park and its visiting guest population so as to automatically process and issue a multi-service guest card, control and monitor admission, perform value-added manipulation of the guest card's contents and to analyze the visitor's buying behavior. The multi-service guest cards are realized by smart debit card technology and, at issuance, have the ability to partition the total monetary amount of the debit card among a plurality of categories of prepaid Theme Park goods and services offered at various point-of-sale locations in the Park. Biometric identification of card holders can optionally be encoded on the smart cards upon issuance and can be verified at various point-of-sale locations within the Park confines upon smart-card purchase of goods and services.

31 Claims, 11 Drawing Sheets

```
┌─────────────────────────────────────────────────────┐
│              GUEST CARD - CONTENT                   │
├─────────────────────────────────────────────────────┤
│ BUTTON   BUTTON      .   .   .   .       BUTTON    │
│                                                     │
│              DEMOGRAPHICS                           │
│                                                     │
│ LABEL: [ BOX ]  LABEL: [BOX]  LABEL: [BOX]          │
│ LABEL: [BOX] LABEL: [BOX] LABEL: [   BOX   ]        │
│   .                                                 │
│   .                                                 │
│ LABEL: [   BOX   ]        LABEL: [   BOX   ]        │
└─────────────────────────────────────────────────────┘

┌─────────────────────────────────────────────────────┐
│                 SERVICE TYPE                        │
│                                                     │
│ DESCRIPTION [$] DESCRIPTION [$] ... DESCRIPTION [$] │
│                                                     │
│ DESCRIPTION [$] DESCRIPTION [$] ... DESCRIPTION [$] │
└─────────────────────────────────────────────────────┘

┌─────────────────────────────────────────────────────┐
│                DETAILED STATUS                      │
│  SERVICE     MONEY-AMOUNT    REQUESTED   REMAINING  │
│  CATEGORIES  IN GUEST CARD   SERVICE     BALANCE    │
│                                                     │
│  ITEM        AMOUNT          AMOUNT      AMOUNT     │
│  ITEM        AMOUNT          AMOUNT      AMOUNT     │
│   .                                                 │
│   .                                                 │
│  ITEM        AMOUNT          AMOUNT      AMOUNT     │
└─────────────────────────────────────────────────────┘
```

GUEST CARD - COMPILATION

| BUTTON | BUTTON | . . . . | BUTTON |

DEMOGRAPHICS

LABEL: [BOX]  LABEL: [BOX]  LABEL: [BOX]

LABEL: [BOX]  LABEL: [BOX]  LABEL: [BOX]

. . .

LABEL: [BOX]  LABEL: [BOX]

PAYMENT OPTIONS

OPTION: ☐  OPTION: ☐  . . .  OPTION: ☐

OPTION: ☐  OPTION: ☐  . . .  OPTION: ☐

CARD TYPES

TYPE: ☐  TYPE: ☐  . . .  TYPE: ☐

TYPE: ☐  TYPE: ☐  . . .  TYPE: ☐

FIG. 4

| GUEST CARD - CONTENT |
|---|

| BUTTON | BUTTON | . | . | . | . | BUTTON |
|---|---|---|---|---|---|---|

DEMOGRAPHICS

LABEL: [ BOX ]  LABEL: [ BOX ]  LABEL: [ BOX ]

LABEL: [ BOX ]  LABEL: [ BOX ]  LABEL: [ BOX ]

. . .

LABEL: [ BOX ]  LABEL: [ BOX ]

SERVICE TYPE

DESCRIPTION [ $ ]  DESCRIPTION [ $ ]  . . .  DESCRIPTION [ $ ]

DESCRIPTION [ $ ]  DESCRIPTION [ $ ]  . . .  DESCRIPTION [ $ ]

DETAILED STATUS

| SERVICE CATEGORIES | MONEY-AMOUNT IN GUEST CARD | REQUESTED SERVICE | REMAINING BALANCE |
|---|---|---|---|
| ITEM | AMOUNT | AMOUNT | AMOUNT |
| ITEM | AMOUNT | AMOUNT | AMOUNT |
| . . . | | | |
| ITEM | AMOUNT | AMOUNT | AMOUNT |

FIG. 5

COMPUTERIZED THEME PARK INFORMATION MANAGEMENT SYSTEM UTILIZING PARTITIONED SMART CARDS AND BIOMETRIC VERIFICATION

This invention relates to a computerized information system for theme park entities and more particularly to the value-added manipulation of data and information that relates to the services and products that are provided by a theme park, to the contents of a visitor guest card, to the behavior of visitors while requesting these services/products, and to the theme park's operations research activities.

BACKGROUND OF THE INVENTION

The computerized information system, which includes means to automatically verify, update and interchange theme park-related data and information, encompasses networked hardware components and distributed software programs and will be used by a variety of theme park environments in connection with the management of the admission, usage and evaluation processes of visitors that will visit these theme park settings.

The intended purpose of the invention is to control the theme parks' operational cost of providing services and products to its visitors and to provide increased convenience and more choices to the visitors. This invention provides solutions to contain these costs while automating the admission task for visitors, streamlining the activities of qualifying and serving visitors with regards to the requested services and/or products, and making the information that relates to the visitor's buying behavior available to the theme park in a real-time manner. This invention also provides benefits to the visitors, while letting visitors tailor their guest card with services/products to fit their particular desire, facilitating the partitioning of services/products within the same guest card, and allowing visitors to manage the money that is loaded into the guest card at any time throughout the visit. As evidence of the date of conception of this invention, the appropriate Disclosure Document No. 313145 was forwarded by the inventor Richard P. Sehr on Jul. 10, 1992 to the U.S. Patent and Trademark Office.

Heretofore, a variety of prepaid cards and devices, such as in U.S. Pat. No. 5,302,811 issued to Kabushiki Kaisha Toshiba on Apr. 12. 1994, in U.S. Pat. No. 5,264,689 granted to Gemplus Card International on Nov. 23, 1993, and in U.S. Pat. No. 5,155,342 granted to Brother Kogyo Kabushiki Kaisha on Oct. 13, 1992, have been proposed. None of these proposals of the prior art, however, provide a systems solution for entities that want to use prepaid cards throughout their operations. The limitations of these proposals center around the fact that these inventions focus onto the prepaid cards merely as a device for loading/retrieving money therefrom and not on how to act as a systems integration tool. The proposals of the prior art also do not address the questions of (1) What specific cost savings do the systems facilitate, (2) How the prepaid cards will function in computerized platforms, (3) How and when the cards will handle the exchange of data and information in a real-time manner, (4) What are the privacy concerns and security requirements that are needed, and (5) How the inventions will adopt to future needs and developments. Accordingly, there is a need for a system that provides answers to these issues.

BRIEF SUMMARY OF THE INVENTION

This invention provides a method of constructing, and a system comprising, a functional framework, operational structure, and systems architecture for an integrated, multi-functional management information system for theme park entities. The preferred embodiment of the present invention includes guest cards, a database scheme and computerized means for performing the manipulation and management of dam and information with respect to a visitor that requests the rendering of services and products.

The guest cards, which will be issued to the individual visitors as personal identification devices (i.e. as a pass, frequent-visitor card, etc.), are represented by "smart cards" that have a shape similar to plastic bankcards but with silicon chips and software embedded into the card package. The smart guest card will identify the rightful cardholder and guarantee the eligibility of that particular visitor to receive the appropriate services and/or products that are stored into the guest card. The implementation of the guest cards as pocket-sized computers allows the visitor's card to operate within a stand alone system, fully integrated systems environments, or both, as well as with proprietary, incompatible system platforms.

The database scheme facilitates the integration and networking of the theme park operations and visitors within a single system so as to allow a real-time interaction and information exchange between al systems components while operating in a distributed, decentralized processing environment. The individual databases contain the data and information that is related to the services and products that are provided by a particular theme park, to the access control of the theme park's events, to the security protection of the guest cards, to the visitor demographics, and to the theme park's operations, including an appropriate audit trail and regular backups.

Accordingly, the present invention provides a secure, automated, interactive and integrated theme park information management system which includes means for issuing a guest card to the visitors, identifying the visitor, authenticating the guest cards, verifying the eligibility of a particular visitor to receive the requested services and/or products, manipulating and updating the guest card's contents, including payment amount and other service/product-related data, duplicating the guest card's contents if lost, downloading incremental updates automatically to all databases, providing a bridge between stand alone off-line settings, and means for implementing secure protection schemes for the guest cards.

Based upon the objects and features of the invention, advantages of this invention will include reduced administrative costs through automated data entry and retrieval, computerized manipulation of information, conformity to pre-defined procedures as well as reduced paperwork, improved productivity through availability of computerized guest cards with complete and accurate information, use of pre-designed templates and terminal screens as well as implementation of a "cash-less" payment methodology, better quality of services and products through faster admission of visitors, more time available for the actual service of visitors versus the processing of paperwork, more streamlined operations as well as immediate availability of up-to-date information for micromarketing and inventory management purposes, and more convenience for the visitors through the availability of individualized guest cards, more service/product selections to choose from, faster throughput at the theme park events as well as value-added money management schemes and bonus programs based upon the usage of the guest card.

BRIEF DESCRIPTION OF THE DRAWINGS

The following is a list of the terms utilized throughout the descriptions of this invention:

LABEL=a descriptive alphanumeric term, or an abbreviation thereof, to designate the contents of a box that follows that label.

BOX=a space allocated to display conventional symbols that are used in computer work onto computer terminal screens, including any alphabetic or numerical data.

BUTTON=a key similar to a push-button switch or a functional key that, when selected, initiates the implementation of one or more operational tasks the button is programmed SECTION=a distinct portion of the text and/or graphics that is displayed onto computer terminal screens.

FRAME=a visual border to delimitate one or more headings, labels, boxes, buttons, sections or any text that is displayed as a table-like structure.

SCREEN=the ensemble of all text and/or graphics that is displayed on the computer terminal screen at any given moment.

HEADING=the text at the head of a frame, screen, or the like, that provides a summary statement of the information, which will be displayed following that heading, or the status of the information system at a particular time throughout its operational functionality.

TEMPLATE=a computer file that contains the styles, shapes, number, and settings for the individual frames including the components thereof, as well as the overall format and content of the screens that will be opened by that template.

Figure 1:
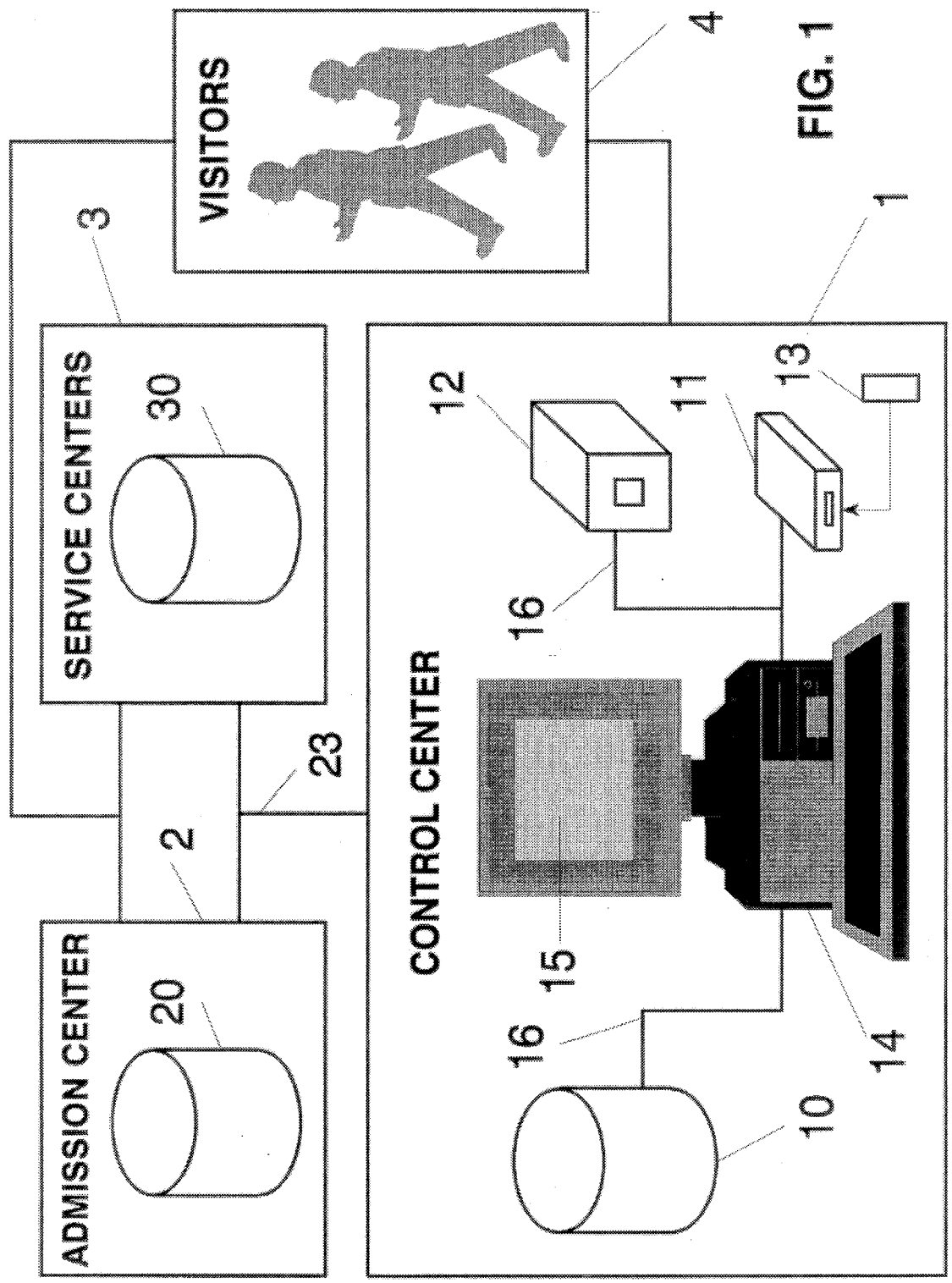

FIG. 1 is a block diagram that illustrates a typical systems environment whereby a group of visitors interfaces with a variety of operational centers throughout the theme park's premises.

Figure 2:
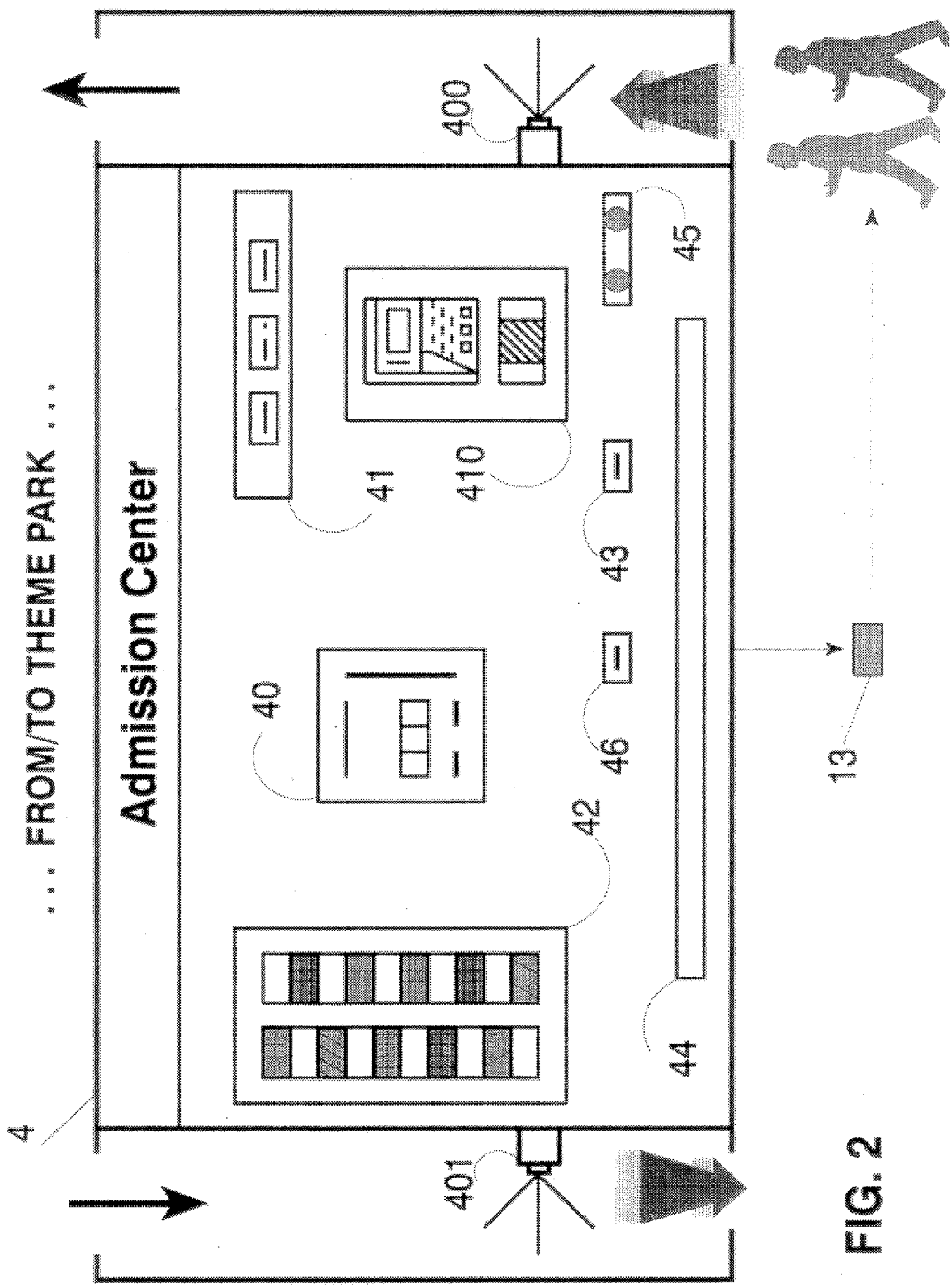

FIG. 2 illustrates the details of the admission centers that will be located at the theme park's entrance(s).

Figure 3:
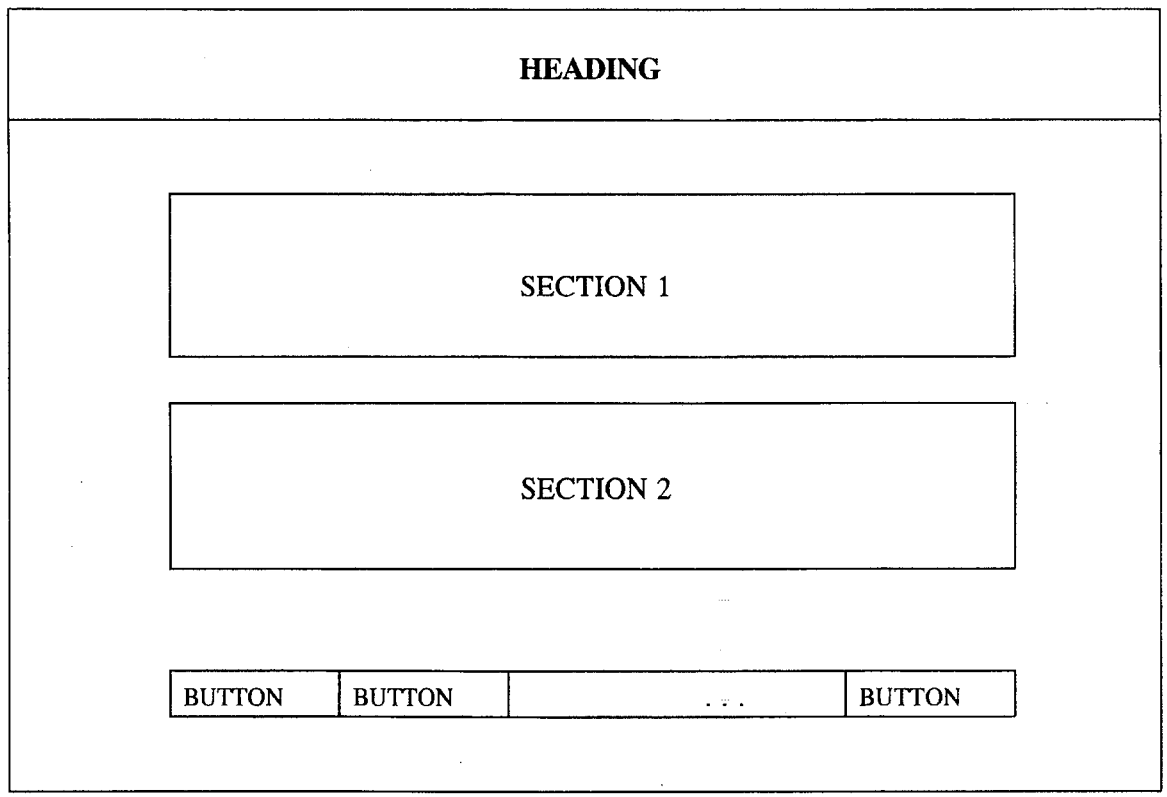

FIG. 3 through FIG. 5 illustrate the various predefined, tailored templates that will be used by the system and/or displayed on the computerized terminal screen:

FIG. 3 visualizes the format and content of the pop-up and/or pull-down selection menus that will be displayed onto the terminal screen. Section 1 describes the available choices with respect to the theme park's services and products, as well as explains the status of what happened as a result of a particular command or function being executed. Section 2 lists the payment amounts that are needed for the above services/products, as well as recommendations about how to proceed within the operational program and the outcomes that are associated therewith.

FIG. 4 shows the template structure that will be used to enter, display, and manipulate the information that is related to the visitor's demographics data, the different payment options, and to the various guest card configurations within a format suitable to be loaded into, or retrieved from, the visitor guest card and one or more of the databases. In this context, the visitor may enter his/her name and address into the guest card (i.e. demographics/labels), select to pay with a major credit card (i.e. payment options), and choose a guest card that has a favored cartoon imprinted on the back of the card and his/her picture onto the front of the card (i.e. card types).

FIG. 5 illustrates the structure that will be used to capture, organize, and display the guest card contents that includes the visitor's demographics data, type of services/products, and a detailed status of the services and products the guest card is entitled to as well as how much money is in the guest card at any given moment. Let's suppose a visitor wants to tailor his/her card to be a general admission pass and valid for all major rides (i.e. service/description), while partitioning the money amount that is loaded into the guest card as follows: 50% for events, 30% for food, and 20% for retail purposes (i.e. service categories). This methodology means that if the visitor spends the money that is allocated for rides and retail purchases (i.e. the 50% and 20% portions), he/she can use the rest of the money only to purchase food items (i.e. the 30% portion). This type of money management is also convenient when buying cards for children and one wants to make sure they buy some food and not only roller coaster rides.

Figure 6A:
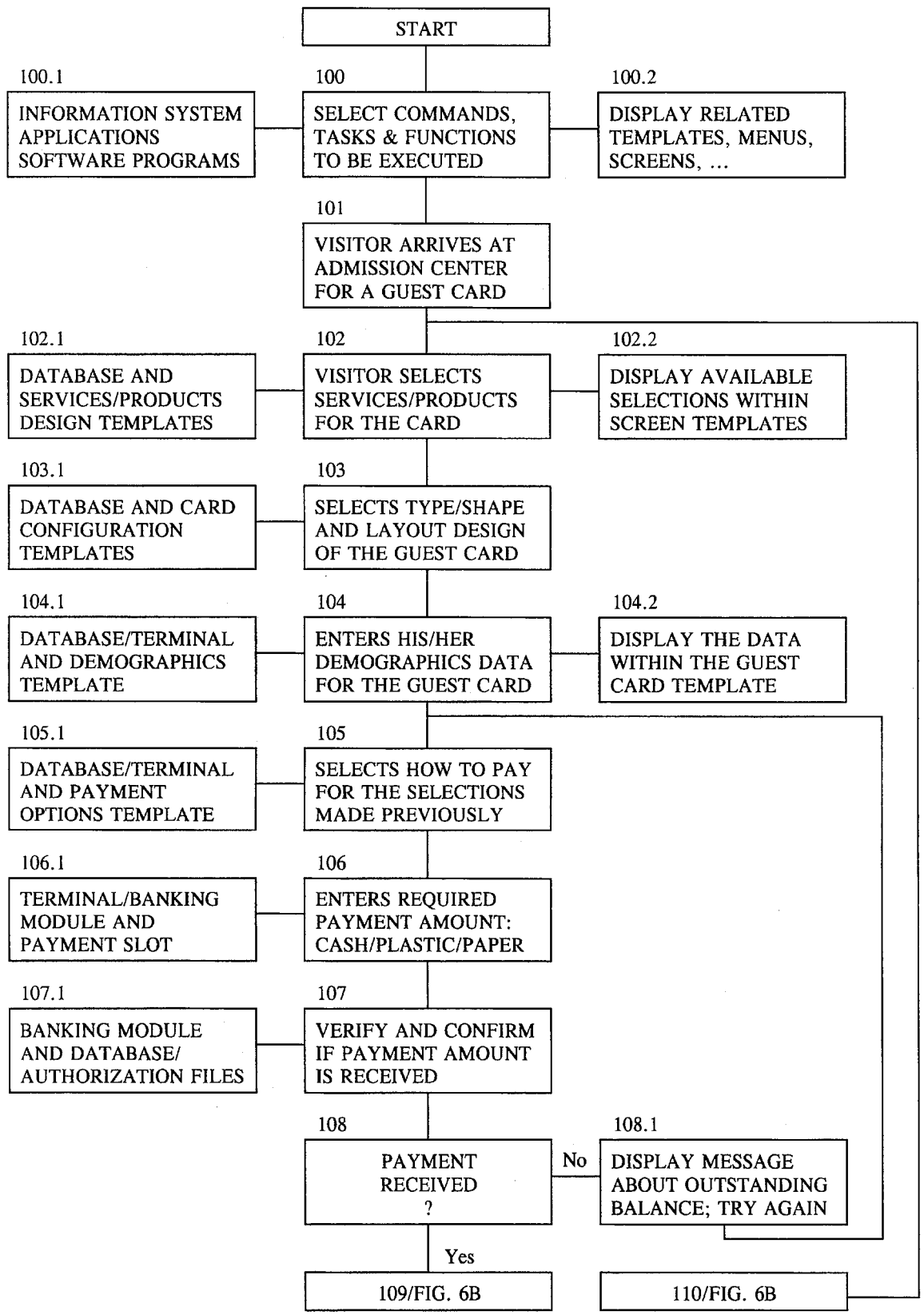
Figure 6B:
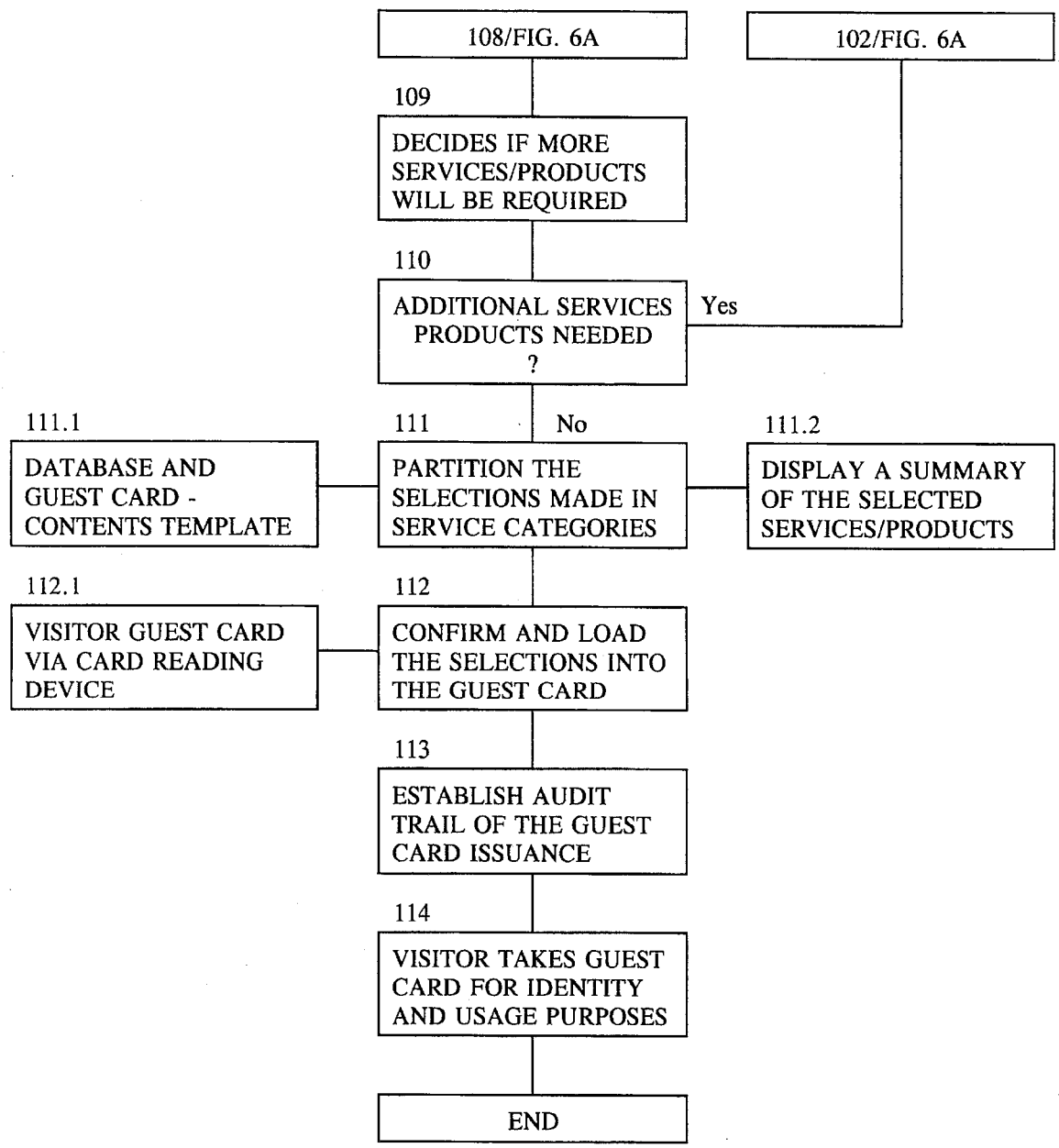

FIG. 6 through FIG. 8 illustrate the flow chart of a computer program for use in an embodiment of a system according to the present invention:

FIGS. 6A and 6B describe the flow chart for the computer program that facilitates the loading and retrieval of data into/from the guest card, the selection of the type and amount of data to be manipulated, and the authorization and storage of payment amounts into the card.

Figure 7A:
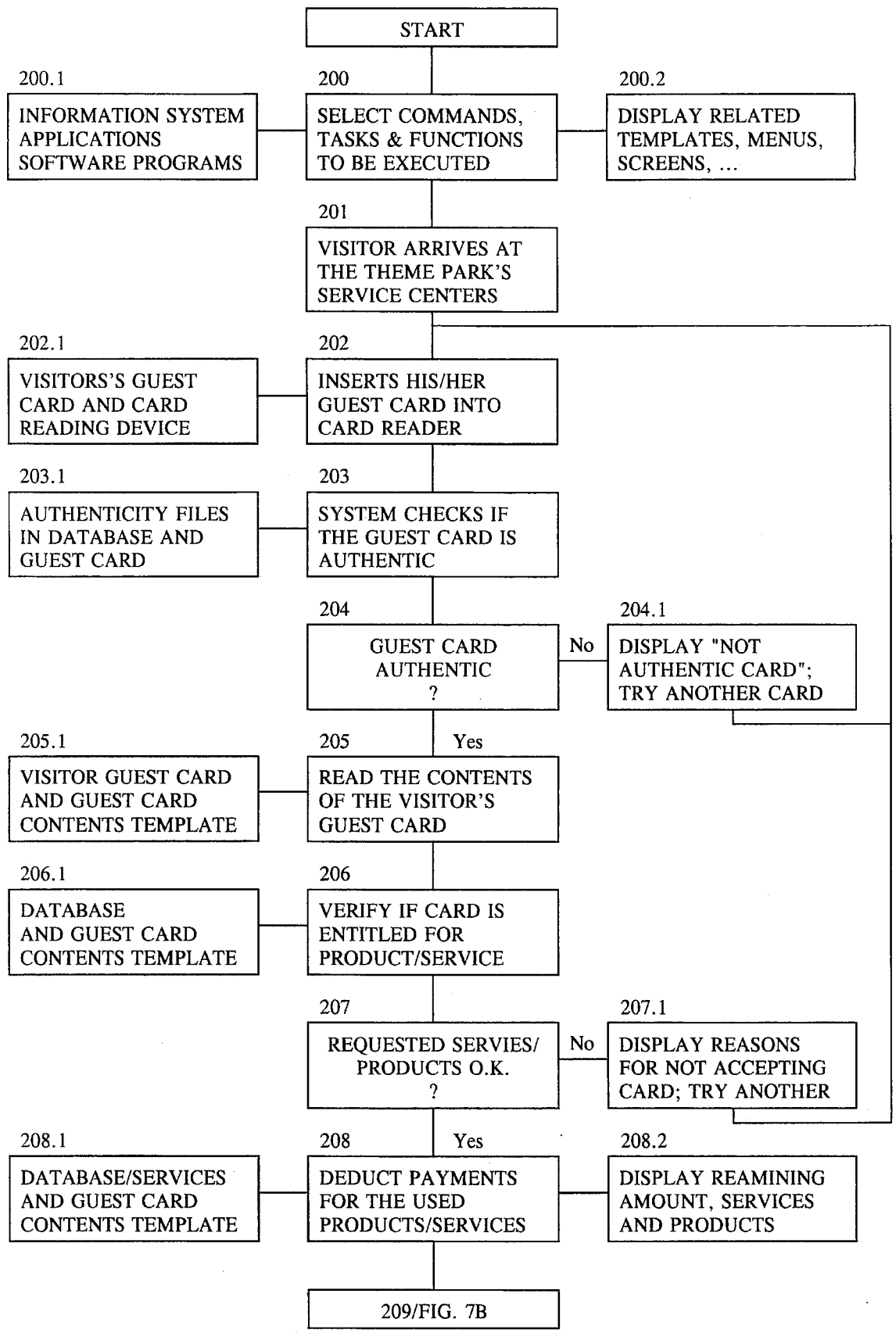
Figure 7B:
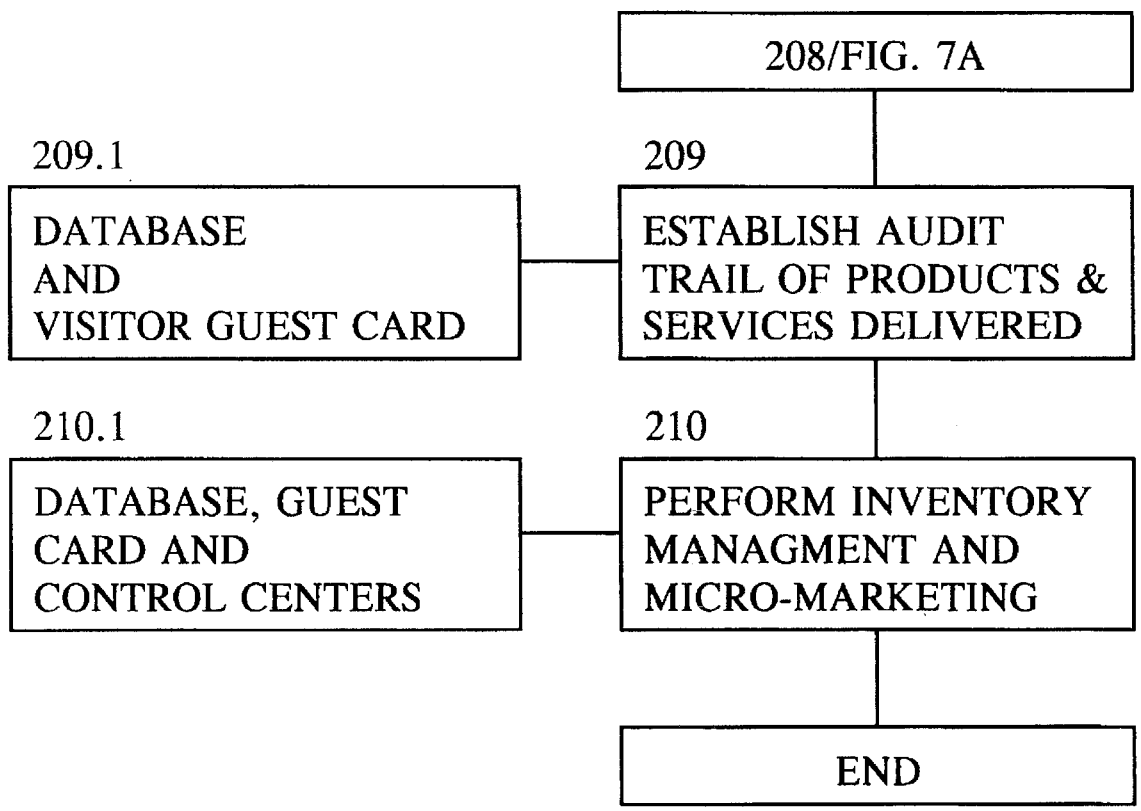

FIG. 7A and 7B illustrate the flow chart for a program that allows the visitor to get access to the events and receive the services/products as specified by the guest card, the guest card to interact with the theme park's point-of-service stations, the contents of the guest card to be automatically updated so as to reflect the remaining entitlement, and the implementation of operational and marketing programs.

Figure 8A:
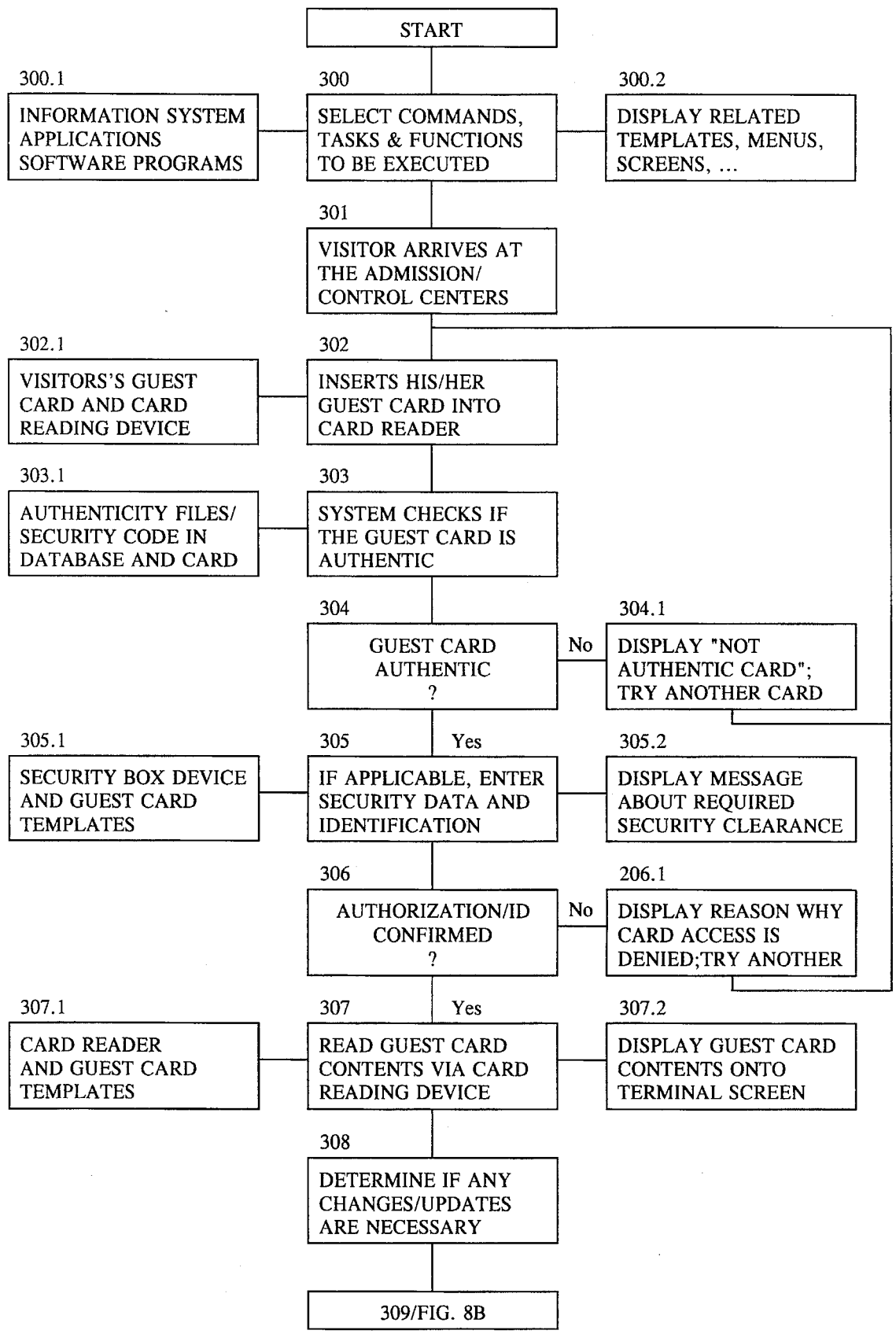
Figure 8B:
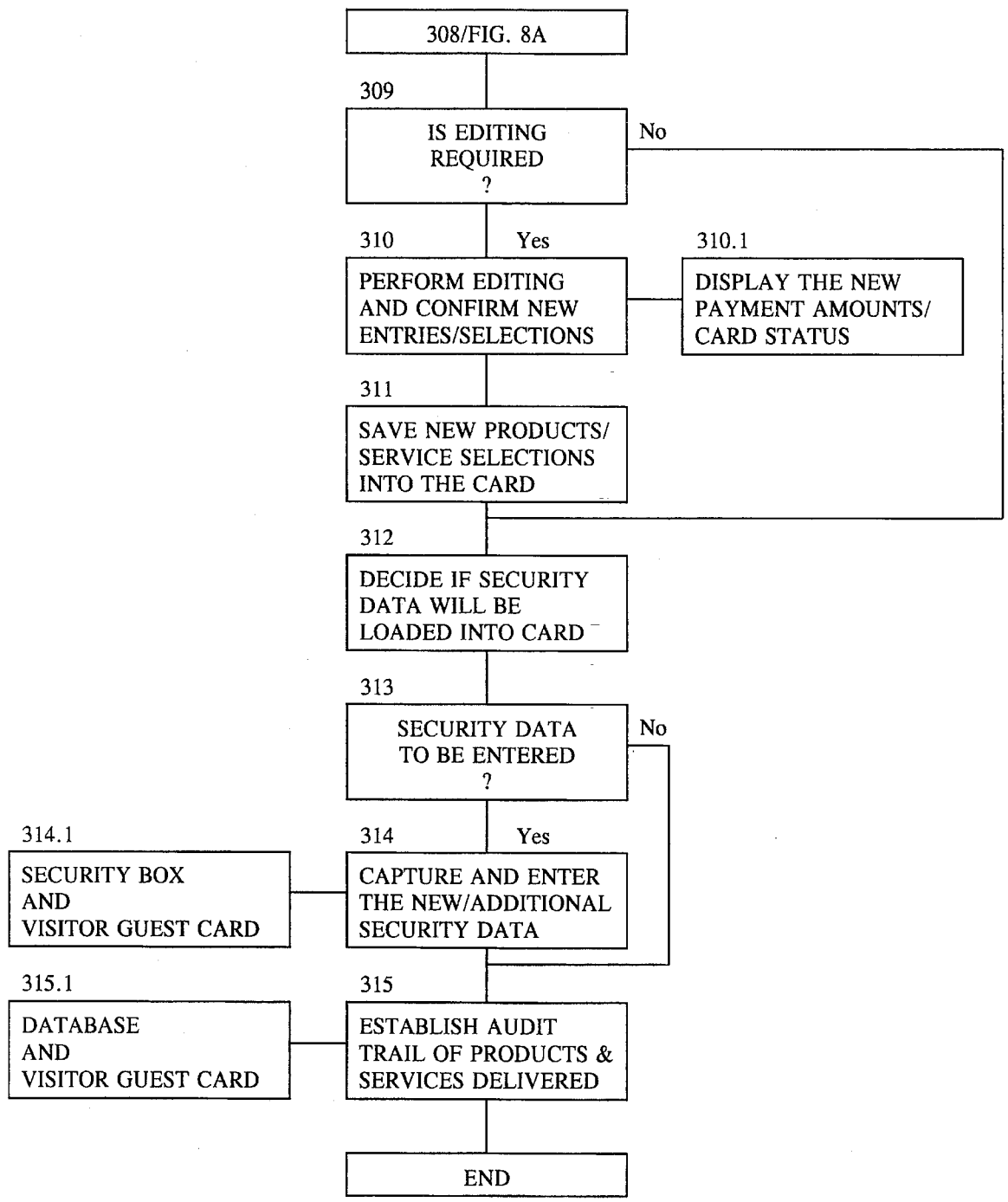

FIG. 8A and 8B show the flow chart for a program that lets the visitor interactively update his/her guest card with new or different services and products additional money, and other value-added features.

DESCRIPTION OF A PREFERRED EMBODIMENT

FIG. 1 depicts the major components of a preferred system in accordance with the principles of the invention. This block diagram illustrates the major theme park entities that are interacting within the information management system ("system"). The control center 1 includes the settings that are needed to manipulate the guest card's contents and the data records that are contained in the database. The admission center 2 implements the issuance of guest cards and access control of visitors. The service centers 3 encompass a variety of providers of services and products, such as attractions, events, food outlets, retailing, hotels, parking, etc. These centers can be located within the same theme park or at different theme parks. The visitors 4 represent individuals, or groups thereof, that will visit the theme park's premises and select from the services and products that are offered by the theme park.

The Databases 10, 20 and 30 correlate to the appropriate them park entities, such as control center 1, admission center 2, and service centers 3 respectively. These databases contain the data records and all appropriate information, as well as the template files that are needed to implement the system's operational functions, including communications and data security management. The smart card reader 11 allows the PC-machine 14, or any other computer terminal, to read data from, or to write data into, the visitor guest card 13 that is inserted, or placed in the vicinity of, the smart card reader. The biometrics box 12 allows the PC to capture the biometrics characteristics, such a fingerprints, voice, digital signature, picture or retina of a particular cardholder, so that the system can compare this biometrics data with the one stored in the databases or guest card. The PC-machine 14, which is shown as a point-of-service station for the control center 1, represents any number of such stations that can be stand alone stations or configured as client-server networks, or an integral part of mainframe-based MIS (Management Information Systems) computer platforms that are located at the theme park's premises. The PC-monitor 15, or any other computer terminal screen, represents the media for displaying any data, including text and graphics, onto the PC-screen. The link 23 between the centers and databases per se, as well as the link 16 between the local systems components, can be implemented by any commercial available wire-based or wireless communications technology, including telephone and modem equipment.

FIG. 2 depicts the admission center in more detail. The touch-screen 40 is a computer based unit that will guide the processing and dispensing of the visitor guest cards. The center will allow the visitors to choose from a variety of payment options 41 and card configurations 42. The touch-screen guides the visitors through a series of steps with the help of pop-up and pull-down menus. This user friendly methodology lets the visitors devise their own program regarding how much money they want to spend during their visit, where, and under what circumstances. The payment options include cash, checks, travelers checks, foreign currency, and major credit/debit cards. Should a particular payment option need to place an authorization request to an outside banking entity or clearing house, the banking module 410 will facilitate the necessary approval process and appropriate money transfer. The admission center also accepts guest cards previously issued by the theme park. A slot 43 is used for reloading or transfer of payment and theme park related privileges into these cards. Although the guest cards are conforming to a standardized form, they have different graphics, colors, logos or text imprinted on the card body. The visitors select the card type they prefer to use during their visit, keep as a souvenir or collectors item, or even reuse at a subsequent visit. Once selected, the guest cards will be dispensed through a tray 44. A speaker/microphone module 45 allows two-way communications, between the visitors and the park's customer service representatives, should visitors need any help or assistance. Slot 46 will be used to store security data into the guest card should the visitor decide to do so. For example, a PIN (Personal Identification Number) can be used to safeguard the guest card's contents, if lost, against fraudulent use. The access modules 400 and 401 control the entrance and exit of visitors. The visitors need to insert their guest card into these modules when entering or exiting the theme park. This methodology prevents the transfer and usage of one guest card by more than one visitor.

The basic feature of the information system is that the distributed databases 10, 20 and 30 always will contain the same data that is required to decide if a visitor is entitled to receive the services or products he/she is requesting. This availability of the latest data is guaranteed by the system's build-in mechanism of exchanging data in a real-time manner. In other words, if changes and/or updates are performed by any of the theme park entities, all other entities will be automatically receiving this new data. Such an incremental exchange is not only fast and reliable, but also efficient because of immediate availability of the same data to all entities. In addition, the guest card, which can act as a portable database and/or off-line processing unit, also will free the system frown lengthy and costly manual/paper-based modus of operandi while providing the bridge for stand alone or incompatible systems configurations. In the above systems context, FIG. 6 through FIG. 8 that illustrate the flow charts describing in more detail the operations of the information system in FIG. 1 and FIG. 2, will now be considered:

Starting with FIG. 6A, block 100 indicates that a system user can instruct the information system to select and execute a variety of operational functions under the auspices of the applications program, as shown by block 100.1, and the assistance and guidance of the command buttons, template files (i.e. shown by FIGS. 3 through 5) and pull-up/pop-down menus (FIG.2 depicts, for example, such a menu in more details), as shown by block 100.2.

Block 101 indicates that a visitor will arrive at the theme park's admission center to compile his/her guest card. As shown by block 102, the visitor starts an interactive session with the system while selecting the appropriate services and products he/she would like to load into the guest card. The source for these selections are the admission center's database as shown by block 102.1, and the available services and products will be displayed within the, different screen templates (i.e. FIG.3 drawing) as shown by block 102.2. Block 103 selects the card configuration for the guest card (i.e. colors, logos, patterns, etc.) and block 103.1 represents the stock of available card configurations. Once the services/products and card configuration are selected, block 104 will enter the visitor's demographics data to be loaded into the guest card. As shown by block 104.1, the entries will be made via the banking module's keypad. Block 105 selects the payment option(s) the visitor wants to use and block 10:5.1 provides the appropriate templates to assist with the previous selection. Block 106 actually enters the required payment amounts via, as shown by block 106.1, the banking module and appropriate payment slots. Block 107 will verify if the required payment amount is received and block 107.1 performs the associated authorization process (i.e. on-line verification of a credit card-based payment or checking of paper-currency). Block 108 verifies if the payment is received or not. If no payment, or not enough payment, is received, then block 108.1 will flag this issue and lets you proceed with another payment options. If the payment amount is satisfactory, then, continuing with FIG. 6B, block 109 will decide if more services/products shall be loaded into the guest card. Block 110 will state if additional items need to be loaded into the card. If more services/products shall be loaded, then block 102 will be next (i.e. to allow the loading of such items). Otherwise, block 111 will partition the final selections per service type and the associated dollar amounts. Block 111.1 will provide the place these selections will be stored within and block 111.2 will display a summary of the selected services and products. Block 112 will confirm these selections and store them, via the card reading device, into the guest card as represented by block 112.1. Block 113 will establish an appropriate audit trail, including proof of what was stored into the guest card, how it was paid for, and who the owner of the guest card is. Block 114 retrieves the guest card for the visitor so that the visitor may use his/her card to gain access to the theme park's premises and to use the card for the services and/or products the card was loaded with.

Starting with FIG. 7A, block 200 indicates that a system user can instruct the information system to select and execute a variety of operational functions under the auspices of the applications program, as shown by block 200.1, and the assistance and guidance of the command buttons, template files (i.e. shown by FIGS. 3 through 5) and pull-up/pop-down menus (FIG.2 depicts, for example, such a menu in more details), as shown by block 200.2.

Block 201 indicates that a visitor will arrive at one of the theme park's services centers to use his/her card for the services/products the guest card is entitled to. As shown by block 202, the visitor inserts the guest card into the card reading device, which is installed at all point-of-service stations. Block 203 checks if the guest card is an authentic card (i.e. issued by the theme park that provides the services/products). Block 203.1 provides the required authenticity files and data for this check. As shown by block 204, the card may or may not be authentic. If the guest card is not authentic (i.e. a forgery), then block 204.1 will display the "not authentic" message and will retain the card for further investigation; the visitor may now insert another card. If the card is authentic, then block 205 will read the contents of the guest card, including the requested services/products that are stored in the card. Block 205.1 provides the card's contents and the guest card template the contents will be read within. Block 206 verifies now if the services/products that were requested by the visitor, are actually stored in the card. If, for example, the visitor wants to gain access to an attraction and/or purchase a T-shirt, then the guest card must contain not only the adequate money but also the service code that matches the codes at the entrance to the attraction and/or at the retail store. Block 206.1 will provide this data that is needed to compare and verify if the guest card is in accordance with the theme park's requirements. Block 207.1 will inform the theme park's personnel if the requested services/products are or are not contained in the guest card. If no such services/products are present, then block 207.1 will display the reason why the guest card can not be, used and let the visitor try another card or depart to load the required data into his/her card. If the guest card entitles the visitor to receive the requested services/products, then block 208 will deduct the dollar amounts that are associated with the consumption of these services and/or products. Block 208.1 will assist with this operation while providing the database and card templates to do so. Continuing with FIG. 7B, block 209 will establish an appropriate audit trail, including what services and products were delivered, at what date and time, at which location, and what visitor did use his/her card thereby. Block 209.1 provides the media to accomplish and store this audit trail. As shown by block 210, the system also performs inventory management functions and micromarketing support. In the former context, the audit trail serves as an input into the theme park's accounting and inventory management systems. By knowing what was sold, where and when, allows a quick reaction to the daily demand-and-supply fluctuations. In the latter context, the theme park receives valuable marketing intelligence information in a real-time manner. Again, based upon the audit trail and the methodology implemented by this invention, all visitors will let a "visible" trail of what they prefer to consume, how much they want to spend on a particular service/product, and how often they visit certain places. And by relating these findings to the visitor's demographics data, the theme park can not only design effective sales promotions and marketing programs but also plan its future offerings accordingly. In addition, the visitor's guest card, which is a reusable and reconfigurable card, can be used as a frequent-visitor pass (i.e. similar to the frequent-flyer program). Based upon the visitor's attendance and purchasing behavior, bonus points may be allocated to that card.

Starting with FIG. 8A, block 300 indicates that a system user can instruct the information system to select and execute a variety of operational functions under the auspices of the applications program, as shown by block 300. 1, and the assistance and guidance of the command buttons, template files (i.e. shown by FIGS. 3 through 5) and pull-up/pop-down menus (FIG.2 depicts, for example, such a menu in more details), as shown by block 300.2.

Block 301 indicates that the visitor wants to either re-load his/her guest card or update the card content's with additional data and features. As shown by block 302, the visitor inserts the guest card into the card reading device that is provided by block 302.1. Once inserted, block 303 checks the authenticity of the card. This process is supported by block 303. 1 that provides the necessary authenticity files and security codes. Block 304 informs about the findings of the authenticity check: if the card is authentic, block 305 will be next, otherwise block 304.1. Block 304.1 will display the caution that the card is not authentic and will reject the guest card. The visitor may try another card while starting over with block 302. Block 305 will allow the visitor to enter personalized information, such as a PIN or other protection schemes, into the system. Block 305.1 provides the device that is needed to capture and enter the appropriate security data and the guest card these security data will be compared against. Block 306 will flag the visitor it: such security features are required at this time. Block 306 will confirm the successful comparison or flag the failure thereof. If the visitor is not authorized to manipulate the content of the card i i.e. stolen/lost card), then block 206.1 will display the reason why access to the card is denied and retain the card to protect the unauthorized usage thereof. The system is now ready to proceed with another card (i.e. block 302). If the visitor is authorized to proceed, then block 307 will read the contents of the guest card with the help of block 307.1, which provides the card reading device, and, as shown by block 3027.2, will display the contents onto the terminal screen. Block 308 allows the visitor to edit his/her guest card if so desired. Block 309 verifies if such editing is requested or not. If no editing will be performed at this time, then block 312 will be next. Otherwise block 310 will perform any of the editing tasks and, as shown by block 310.1, display the new entries into the guest card (i.e. increased dollar amounts, additional services, more products, etc.). Block 311 will save this entries into the appropriate services/products categories as related partitionings. At this time, block 312 will let the user enter new/additional security features into the card. If no features will be loaded, then block 315 will be next. If such security data will be entered, as shown by block 313, then block 314 will capture and enter this data with the help of block 314.1 that provides the means to accomplish this process. In this context, the visitor may choose how complex the security features shall be: from the straight forward PIN or visitor's picture to the capture of fingerprints or voice imprints. Block 315 will establish the appropriate audit trail and proof that data and features were entered into, or deleted from, the guest card, including who did it, when and where. At the same time, block 315 will forward a synopsis of the data that was loaded into, or is present within, the card to all of the theme park's entities. In this way, the entities are informed about the existence and authenticity of the visitor's guest card. The guest card is now "certified" for usage.

I claim:

1. A computerized theme park information management system for operation with a plurality of theme park entities including product and service providers and guest cards held by persons admitted as theme park guests; said system comprising:

a) means for operating in either or both of a first networked on-line mode and a second stand-alone off-line mode;

b) means for authenticating any particular one of a plurality of said theme park entities;

c) means for locating, retrieving, and verifying data from a database distributed among said entities including in said guest card;

d) means for entering, storing, and updating guest related data and theme park related information into said database;

e) decision logic means for determining whether a particular guest card should be accepted by a product or service provider for a requested product or service based on information stored in said database;

f) means for value-added manipulation of theme park data and related information; and g) security means for protecting guest card data and theme park operation;

h) said means for value-added manipulation of theme park data and related information including;
  (i) means for editing the stored guest card data contents and for saving the edited data in said database, including in said guest card;
  (ii) means for selecting a payment option from among a plurality of payment options and a card type from among a plurality of card types and for loading value into said guest card based on said selected payment option;
  (iii) means for selecting the services and products for which said guest card shall be valid;
  (iv) means for partitioning said loaded value among said different service and product categories; and
  (v) means for duplicating the contents of said guest card.

2. A computerized theme park information management system for operation with a plurality of theme park entities including product and service providers and guest cards held by persons admitted as theme park guests; said system comprising:

a) means for operating in either or both of a first networked on-line mode and a second stand-alone off-line mode;

b) means for authenticating any particular one of a plurality of said theme park entities;

c) means for locating, retrieving, and verifying data from a database distributed among said entities including in said guest card;

d) means for entering, storing, and updating guest related data and theme park related information into said database;

e) decision logic means for determining whether a particular guest card should be accepted by a product or service provider for a requested product or service based on information stored in said database;

f) means for value-added manipulation of theme park data and related information; and g) security means for protecting guest card data and theme park operation;

h) said means for protecting guest card data and theme park operation including:
  (i) means for storing security data into said guest card for an authorized guest card user, said means for storing security information including means for capturing biometrics characteristics for a guest card user;
  (ii) means for comparing said stored security data including said biometrics characteristics against security data for any particular guest including actual physical biometrics characteristics of said particular guest and for verifying that said stored security data matches the security data of said particular guest; and
  (iii) means for verifying the presence and authenticity of service and product type validity data stored in said guest card when requesting service from a product or service provider at a particular point-of-service station.

3. A distributed computer information management system for a theme park, said system comprising:

at least one card purchase interface for presenting guest card characteristic purchase options to a guest prior to purchasing a card and for accepting selection responses from said guest in response to said presented purchase options; said purchase options including selection of a total monetary value associated with said card, a payment option from among a plurality of payment options, and at least one category of products and services for which said card is to be valid from among a plurality of product and service categories;

means for partitioning said total monetary value among said selected categories of product and service, with different amounts of value being allocable to each of said selected categories;

card issue means for physically issuing said card having said selected total monetary value and product and service categories identified therein to said guest after said guest has provided all of the selection responses required for card issuance;

a plurality of service provider interfaces for authorizing use of said card by a guest presenting said card for products and services;

database means for storing information pertaining to operation of said theme park including said total monetary value and said value category partition information associated with each said card; and means for updating said database to deduct the monetary value of products and services accessed with said card according to the category of said accessed product and service.

4. The system in claim 3, wherein said card is a smart card including a plurality of non-volatile storage locations partitioned according to the organization of a data structure; wherein said data structure defining: a first storage location for storing a current monetary value data; and a second storage location for storing partition information identifying the amount of said current monetary value data that is allocated and may be spent for particular categories of products and services.

5. The system in claim 3, wherein said database is a distributed database including a plurality of data storage means, said plurality of data storage means including an issued guest card.

6. The system in claim 5, wherein said database further includes authenticity files and security codes for use in verifying that a particular card presented as payment for products and services contains valid payment data; and said system further comprises means for verifying that said payment data is valid and for denying access to a product or service when said payment data is not valid.

7. The system in claim 3, wherein said database further includes security data for use in verifying that a person presenting a particular card as payment for products and services is authorized to present said particular card for products and services; and said system further comprises means for verifying that a particular user presenting a particular card as payment for products and services is authorized to present said card and for denying access to a product or service when said guest is not authorized.

8. The system in claim 7, wherein said security data is selected from the set of security data types consisting of a personal identification number (PIN) data, a data item representative of the authorized guest's visual appearance, fingerprint data, signature data, voice print data, and other biometrics characteristics data of an authorized guest, and combinations thereof.

9. The system in claim 8, wherein said purchase options further include selecting at least one security data type from among said plurality of security data types for use in verifying that a person presenting a particular card as payment for products and services is authorized to present said particular card for products and services.

10. The system in claim 9, wherein said system further comprises means for verifying that a particular guest is an authorized user of a particular card.

11. The system in claim 9, further including means for storing said selected security data type into said particular card, and said system further comprises means for comparing said stored security data with security data inputted by a guest and denying access to the card content when a discrepancy is identified between said stored and inputted security data.

12. The system in claim 11, wherein said system further comprises input means for inputting security data by a guest for use in making said comparison.

13. The system in claim 7, wherein said security data comprises biometrics characteristics data, said biometrics characteristics data is stored in data storage means on said card, and said system further comprises means for comparing said stored biometrics data with a guest's actual biometrics data, and for denying access to a product or service when a discrepancy is identified between said stored and said captured biometrics data.

14. The system in claim 13, wherein said system further comprises biometrics characteristics input means for capturing biometrics data from said guest for use in making said comparison.

15. The system in claim 3, wherein said card is a smart card including a memory.

16. The system in claim 3, wherein said at least one card purchase interface comprises a display screen for displaying graphical and textual information, a touch-sensitive input means for receiving guest inputs, and means for receiving acceptable payment from said guest, said acceptable payment including cash, credit card, and debit card.

17. The system in claim 16, wherein said acceptable payment further including checks.

18. The system in claim 3, wherein said card purchase interface further includes means for editing the information stored in said database including in said card, including said partition information.

19. The system in claim 3, further comprising a multi-directional interactive data communication link between said database, said at least one card purchase interface, said card issue means, and said plurality of service provider interfaces, for communicating card and database information including card and guest security information between and among said system components.

20. The system in claim 3, further comprising a two-way data communication link for sending a request for payment services to a financial institution and for receiving the authorization for payment in response to selection of an appropriate payment option, said appropriate payment option including a credit or debit card payment selection.

21. The system in claim 20, wherein said appropriate payment option further including a check payment selection.

22. The system in claim 3, wherein said card purchase interface further includes means for selecting the card from a menu comprising a set of card types having different colors, text, and graphics imprinted onto the exterior of said card package.

23. In a theme park that provides a variety of products and services to guests in exchange for the payment of fees associated specifically with said products and services, a method for controlling access to said products and services by said guests, said method comprising the steps of:

providing a computer information management system for said theme park including at least one card purchase interface for issuing a card to a guest, a plurality of service provider interfaces for authorizing use of said card by a guest presenting said card for products and services, and database storage means for storing information pertaining to operation of said theme park;

said card purchase interface presenting purchase options to a guest and recognizing and receiving selection information provided by said guest; said purchase options including selection of a total monetary value associated with said card, a payment option from among a plurality of payment options, and at least one category of products and services for which said card is to be valid from among a plurality of product and service categories;

partitioning said total monetary value among said selected categories of product and service, with different amounts of value being allocable to each of said selected categories in response to said guest selections;

storing characteristics of said card in said database including said total monetary value and said value category partition information associated with each said card; and physically issuing said card having said selected total monetary value and product and service categories identified therein to said guest after said guest has provided all of the selection responses required for card issuance.

24. The method in claim 23, further comprising the step of updating said database to deduct the monetary value of products and services accessed with said card according to the category of said accessed product and service.

25. The method in claim 24, wherein said database is a distributed database including a plurality of data storage means and wherein said plurality of data storage means including an issued guest card, and further comprising the step of updating data stored in said card.

26. The method in claim 25, wherein said method further comprises the steps of:

storing security data in said database for use in verifying that a person presenting a particular card as payment for products and services is authorized to present said particular card for products and services;

verifying that a particular guest presenting a particular card as payment for products and services is authorized to present said card; and denying access to a product or service when said guest is not authorized.

27. The method in claim 26, wherein said security data comprises biometrics characteristics stored in data storage means on said card, and said method further comprises the steps of:

capturing actual biometrics data from a guest presenting said card as payment for products and services;

comparing said stored biometrics data with a guest's actual biometrics data; and denying access to said products and services when a discrepancy is identified between said stored and said captured biometrics data.

28. The method in claim 23, further comprising the steps of:

in response to an attempt to access a particular product or service having a sales value, identifying the particular category to which said particular product or service its a member;

comparing the amount of value remaining in said particular category based on said total value, said partition selection, and prior debits to said particular category; and allowing said access if the current value in said current partitioned category value is greater than or equal to said sales value, and otherwise denying access to said selected product or service independent of the current value associated with other categories.

29. A smart card comprising:

a non-volatile memory organized into a data structure defining a plurality of storage locations within said memory;

said data structure defining:

a first data field for storing theme park goods and services partitioned into different service categories with different amounts of credit for each service category, a second data field for storing the most current balance of monetary value remaining in the card, a third data field for storing service codes for admission and purchases; and a fourth data field for storing authenticity data for determining the card's authenticity.

30. The card in claim 29 wherein said data structure further defining a fifth data field for storing security data including biometrics data for identifying the authorized user of said smart card.

31. The card in claim 29 wherein said data structure further defining a sixth data field for storing a real-time audit trail including the identity of the entity who loaded the initial data and information into the card, the identity of any entity who updated the card contents, the date and location of the entries or updates, how much and by what means good and services where paid for, and the identity of the rightful cardholder.

* * * * *